US008346752B2

(12) United States Patent
Sirota et al.

(10) Patent No.: US 8,346,752 B2
(45) Date of Patent: Jan. 1, 2013

(54) SOFTWARE TITLE DISCOVERY (75) Inventors: Joshua Stephen Sirota, Cupertino, CA (US); Narayanan Arunachalam, Sunnyvale, CA (US)

(73) Assignee: BMC Software, Inc., Houston, TX (US)

( * ) Notice: Subject to any disclaimer, the term of this patent is extended or adjusted under 35 U.S.C. 154(b) by 535 days.

(21) Appl. No.: 12/565,287

(22) Filed: Sep. 23, 2009

(65) Prior Publication Data
US 2010/0198843 A1 Aug. 5, 2010

Related U.S. Application Data (60) Provisional application No. 61/149,629, filed on Feb. 3, 2009.

(51) Int. Cl.
*G06F 17/30* (2006.01)
(52) U.S. Cl. ......... 707/708; 707/754; 719/328; 719/329
(58) Field of Classification Search .......... 707/708, 707/754; 719/328, 329
See application file for complete search history.

(56) References Cited

U.S. PATENT DOCUMENTS

| 5,758,154 | A  | * | 5/1998  | Qureshi .................... 713/1 |
| 6,502,124 | B1 | * | 12/2002 | Shimakawa et al. .......... 709/203 |
| 6,978,454 | B2 | * | 12/2005 | Singleton .................... 717/175 |
| 7,058,942 | B2 | * | 6/2006  | Bourke-Dunphy et al. .. 717/177 |
| 7,107,366 | B2 | * | 9/2006  | Cheng et al. .................... 710/36 |
| 7,546,595 | B1 | * | 6/2009  | Wickham et al. ............. 717/168 |
| 7,716,341 | B2 | * | 5/2010  | Takase ......................... 709/227 |
| 2005/0222981 | A1 | * | 10/2005 | Lawrence et al. ................ 707/3 |
| 2009/0094350 | A1 | * | 4/2009  | Rive et al. .................... 709/220 |

* cited by examiner

*Primary Examiner* — Thu-Nguyet Le
*Assistant Examiner* — Andalib Lodhi (57) ABSTRACT

In a computer system that has no single place to discover all installed software applications, a software title discovery technique uses a combination of techniques to discover installed software. One of the combined techniques is an operating system predefined interface for obtaining information about installed software application; other techniques that may be employed include searching a repository of uninstall information, searching for executable files in a portion of a filesystem for the computer, and searching for executable files pointed to by other files in the filesystem of the computer system. A client/server configuration may be employed to allow collection of the software application information across a network of computers in an enterprise by a server computer system, allowing the server system to provide reports regard installed software applications.

19 Claims, 11 Drawing Sheets

SOFTWARE TITLE DISCOVERY

CROSS REFERENCE TO RELATED APPLICATIONS

This application claims priority to U.S. Provisional Application Ser. No. 61/149,629 entitled "Software Title Discovery on Windows Platform" filed Feb. 3, 2009 and which is incorporated by reference in its entirety herein.

BACKGROUND

This disclosure relates generally to the field of computer software. More particularly, but not by way of limitation, it relates to techniques for discovering installed software applications on a computer system.

Identifying installed applications on a computer running a Microsoft WINDOWS® (WINDOWS is a registered trademark of the Microsoft Corporation) platform is challenging because there is no single place where all of the installed applications can be discovered. Applications are not installed in a standard manner and certain components that are part of the operating system look like applications. These challenges surface because software vendors (including Microsoft) do not follow a standard approach to installing software on a WINDOWS platform.

Not all installed applications can be fetched by running a Windows Management Instrumentation (WMI) query. Not all applications are installed using a Windows Installer (previously known as Microsoft Installer or MSI). Shortcuts are created on the Desktop or the Start Menu Programs folder for applications that have a graphical user interface (GUI), but some applications do not have a shortcut at all. The Sun Microsystems Sun JAVA® SE Development Kit (JDK) is an example for this type. (JAVA is a registered trademark of Sun Microsystems, Inc.) Most of the applications are installed under the "Program Files" folder by default; however, some applications are installed elsewhere. The ORACLE® client is an example for this type. (ORACLE is a registered trademark of Oracle Corporation.) The installation information for applications is left in multiple places: the registry, folders, WMI, etc.

Not only do standard tools not identify all applications, they identify as applications software titles that are not applications. An entry is added in the "Add/Remove Programs" applet under "Control Panel" for an installed application. Some entries are added for things other than applications, however, including drivers, updates, and patches applied to the operating system. Therefore identifying installed applications can be challenging.

Other techniques for discovering applications also have shortcomings. For example, shortcuts appear in the "Start Menu Programs" menu for components that are part of the operating system, such as the games "Pinball" and "Solitaire."

In summary, applications installed on a WINDOWS platform do not follow a common paradigm to be able to consolidate a report of what is installed on the box. Software for software title discovery is available from a number of vendors. Examples of such discover software include: BMC Discovery Scanner from BMC Software; Belarc Advisor from Belarc, Inc.; zCI Computer Inventory System, Magnicomp Sysinfo from Magnicomp; iInventory, from iInventory Software; and the OCS Inventory NG system. Previous attempts at doing WINDOWS software discovery either resulted in too much information (a low signal-to-noise ratio), or too little (applications are installed, but not discovered). In addition, previous attempts at software discovery often caused a significant drain on the resources of the computer being scanned, particularly in implementations that do a complete disk scan looking for executables.

SUMMARY

In one embodiment, a method of discovering software applications installed on a computer is disclosed. The method comprises performing a first software application search on the computer system, creating a first set of discovered software application information and performing a second software application search on the computer system, creating a second set of discovered software application information. The first set of discovered software application information and the second set of discovered software application information are then merged, creating a merged set of discovered software application information. The merged set of discovered software application information is then stored. The first software application search employs an operating system defined interface for obtaining software application information.

In another embodiment, a computer readable medium is disclosed. The medium has instruction stored on it that when executed cause the processor of a client computer to perform the method described above.

In another embodiment, a networked computer system is disclosed. The system comprises a server computer and a plurality of client computers. At least one of the client computers is programmed to perform at least a portion of the method described above, and the entire method is performed collectively by the server computer and the plurality of client computers.

In a second embodiment, a method of discovering software applications is disclosed. The method comprises a server computer requesting a client computer to perform software application discovery and receiving a client software application information by the server computer. The server stores the client software application information and generating reports based on the client software application information. The client software application information is derived from a plurality of sources on the client computer that comprise an operating system defined interface for obtaining installed software application information, and another source for obtaining installed software application information.

In another embodiment, a computer readable medium is disclosed. The medium has instruction stored on it that when executed cause the processor of a client computer to perform the method described above.

DETAILED DESCRIPTION

Although the discussion below is set forth in terms of computers running one of the Microsoft WINDOWS operating systems, the present invention is not limited to such computers and operating systems. Instead, the present invention is applicable to any computing device capable of installing applications, and in particular, computing devices where information regarding installed applications is stored in more than one location or in more than one way. A software title, as used herein, means a software application that can be identified by name or other attributes.

Figure 1:
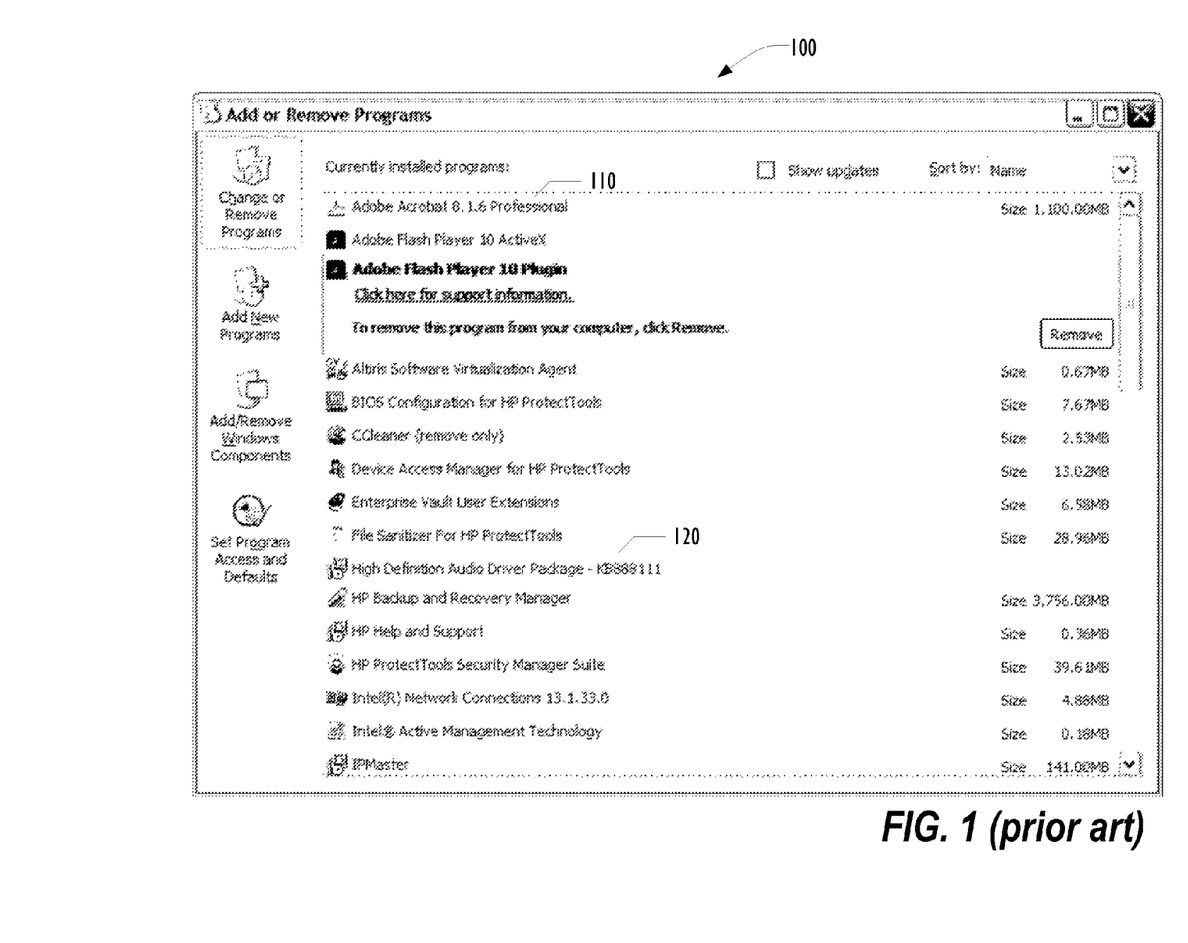
FIG. 1 shows, in screenshot form, an example illustrating an operating system-provided view of installed program according to the prior art.

FIG. 1 is a screenshot 70 from a typical computer running a Microsoft WINDOWS operating system according to the prior art, in this instance the WINDOWS XP® operating system (WINDOWS XP is a registered trademark of Microsoft Corporation). The screenshot of FIG. 1 is taken from the Add/Remove Programs control panel applet, and shows a number of installed applications, for example, the Adobe Acrobat 8.1 Professional application 100. The screenshot illustrates one of the problems with doing software title discovery from this applet: it includes software that is not a separately installed application. For example, entry 120 is an entry for an audio hardware driver. Embodiments of the software title discovery technique disclosed herein preferably exclude drivers and other non-application software that are reported in the programs listed by the Add/Remove Programs applet.

Figure 2:
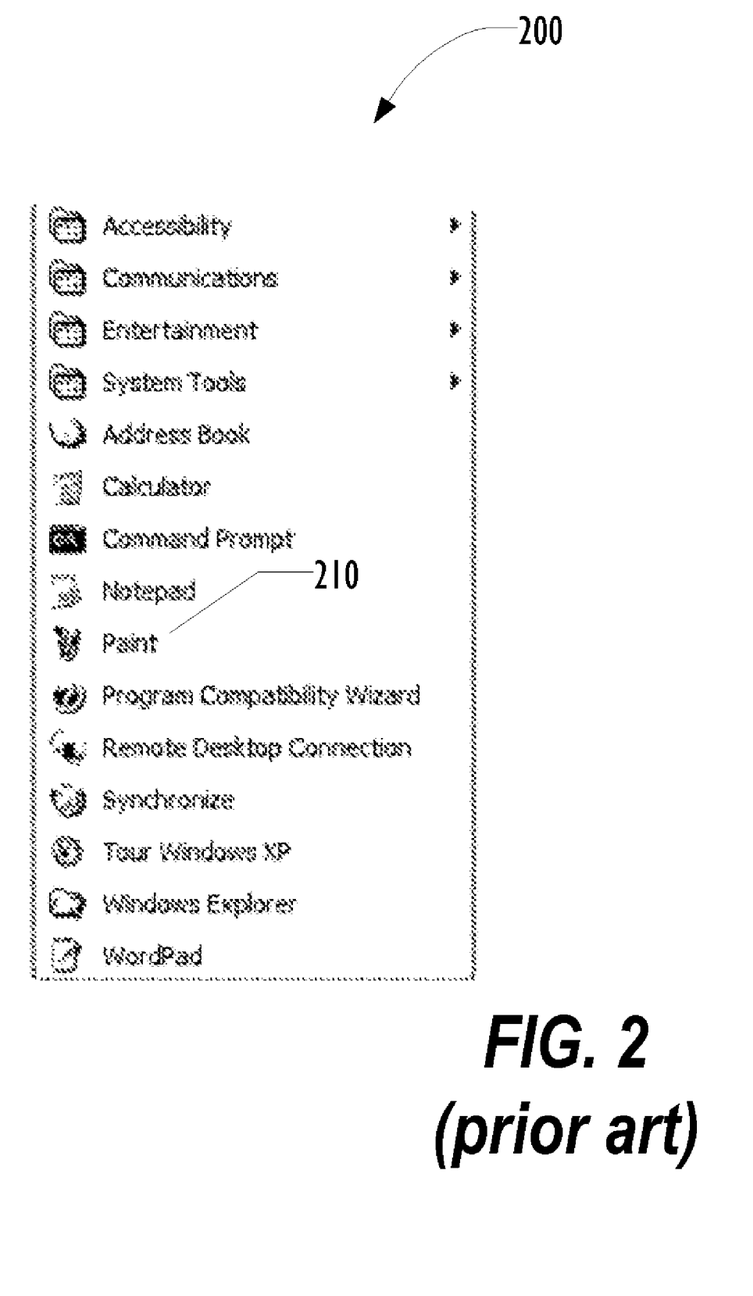
FIG. 2 shows, in screenshot form, an example illustrating a menu that identifies operating system-provided programs.

FIG. 2 is a screenshot of a menu 200 in the Start Menu/Programs hierarchy from the same computer system of FIG. 1, showing Accessories available in the WINDOWS XP operating system according to the prior art. The Paint accessory 210 is an example accessory program that is provided as part of the operating system. Embodiments of the software title discovery techniques disclosed here preferably exclude programs that are delivered as part of the operating system.

Figure 3:
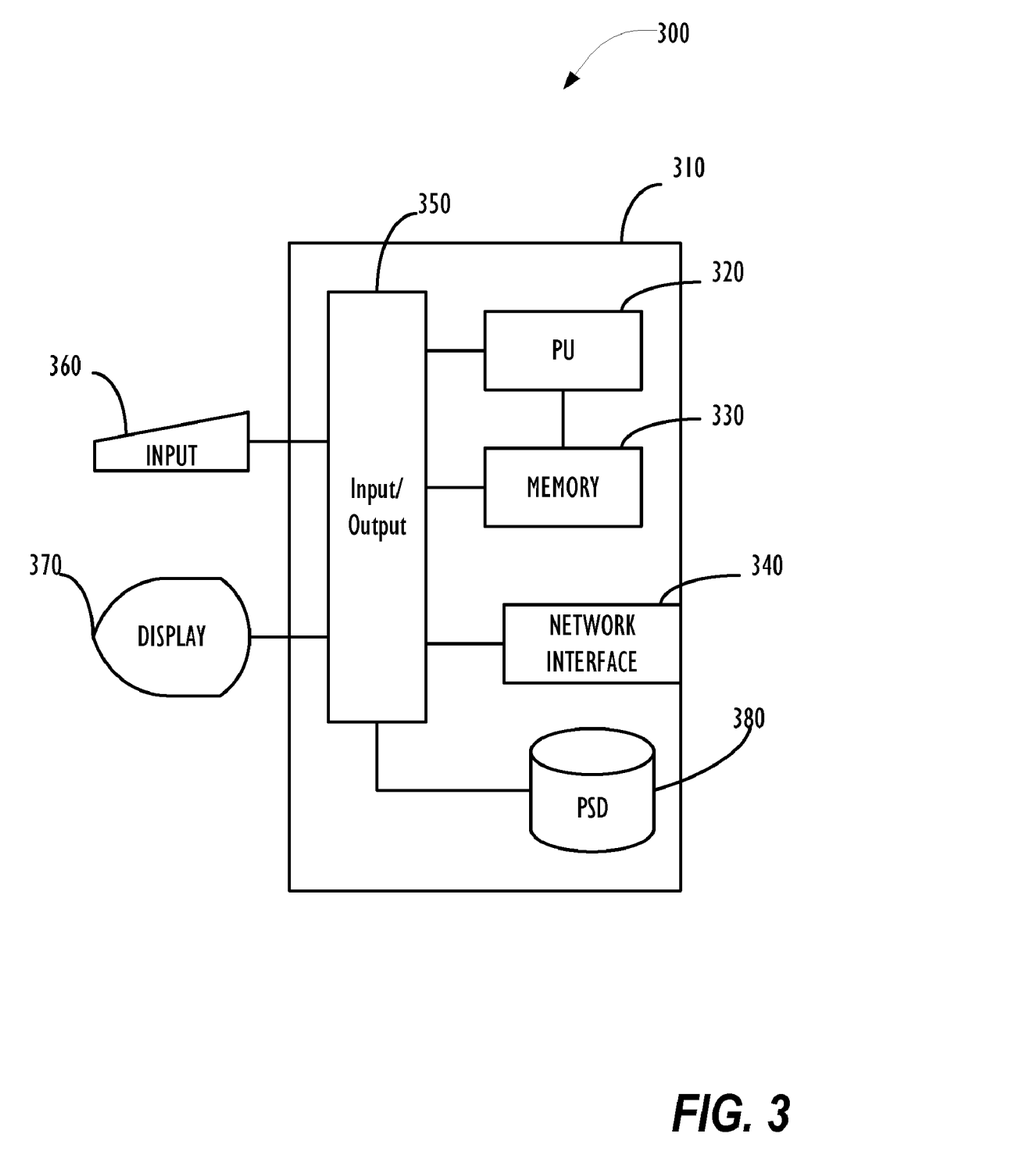
FIG. 3 shows, in block diagram form, an embodiment of a computing device.

Referring now to FIG. 3, an example computing device 300 capable of running a WINDOWS operating system is shown. Example computing device 300 comprises a programmable control device 310 which may be optionally connected to an input device or system 360 (e.g., keyboard, mouse, touch screen, etc.) and display 370. A program storage device (PSD) 380 (sometimes referred to as a hard disc) is included with the programmable control device 310. Also included with programmable control device 310 is a network interface 340 for communication via a network with other computing and corporate infrastructure devices (not shown). Network interface 340 may be included within programmable control device 310 or be external to programmable control device 310. In either case, programmable control device 310 will be communicatively coupled to network interface 340. Program storage device 380 represents any form of non-volatile storage including, but not limited to, all forms of optical and magnetic storage elements including solid-state storage, and may be included within programmable control device 310 or be external to programmable control device 310. Program storage device 380 may be used for storage of software to control programmable control device 310, data for use by the endpoint computer system 300, or both.

Programmable control device 310 may be programmed to perform methods in accordance with this disclosure (examples of which are in FIGS. 7-10). Programmable control device 310 comprises a processing unit (PU) 320, input-output (I/O) interface 350 and memory 330. Processing unit 320 may include any programmable controller device including, for example, one or more members of the Intel Core®, Pentium® and Celeron® processor families from the Intel and the Cortex and ARM processor families from ARM. (INTEL, CORE, PENTIUM, and CELERON are registered trademarks of the Intel Corporation. CORTEX is a registered trademark of the ARM Limited Corporation. ARM is a registered trademark of the ARM Limited Company.) Memory 330 may include one or more memory modules and comprise random access memory (RAM), read only memory (ROM), programmable read only memory (PROM), programmable read-write memory, and solid-state memory. One of ordinary skill in the art will also recognize that PU 320 may also include some internal memory including, for example, cache memory.

Computing device 300 can act as either a server or a client, or both.

Figure 4:
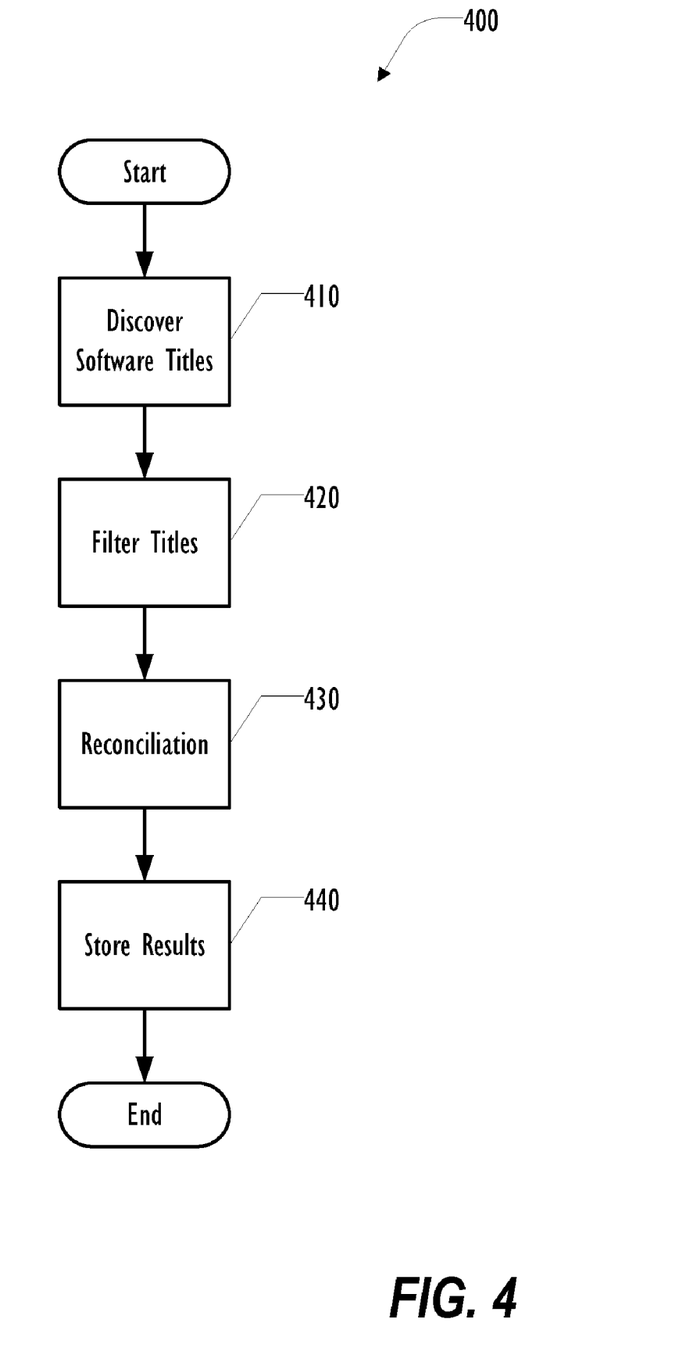
FIG. 4 shows, in flowchart form, an example of a high-level view of a technique for software title discovery according to one embodiment.

FIG. 4 is a flowchart that illustrates one embodiment of a technique for software title discovery at a high level. In block 410, a plurality of techniques, described in more detail below, for discovering software titles are executed. Each of the plurality of techniques interrogates one or more sources of information and produces a resulting list of discovered software titles, which may be stored in any convenient data structure, including being kept in memory. In one embodiment, one of the techniques is a technique defined by a vendor of the operating system for software title discovery, and others of the techniques are additional techniques for software title discovery that may or may not be defined by the vendor of the operating system for that purpose. The result produced by each of the techniques performed in block 410 may be filtered if desired, using a technique-specific filtration technique, to attempt to eliminate results that are not software applications.

After the results from the discovery techniques of block 410 are obtained, then in one embodiment the results are combined and filtered again in block 420 by a filtration technique that is common across all discovery techniques.

In block 430, the combined and filtered results are reconciled with each other to attempt to eliminate duplicate results by merging duplicate entries. Because each of the discovery techniques of block 410 may identify the same software application in a different form, the results are not compared as a whole, but a predefined set of rules are employed to merge results that refer to the same software application.

The reconciled results are then stored in block 440. In one embodiment, the results are stored in a configuration management database associated with a configuration management server, as discussed in more detail below. In another embodiment, the results are stored on the computing device 300 executing the software title discovery software. Typically, reporting software (not described further herein) may be used to provide reports based on the software title discovery technique, either for a user of the computing device 300 executing the software title discovery software, or for a user of an enterprise configuration management software that collects and aggregates information from multiple computing devices 300 deployed by an enterprise.

Figure 5:
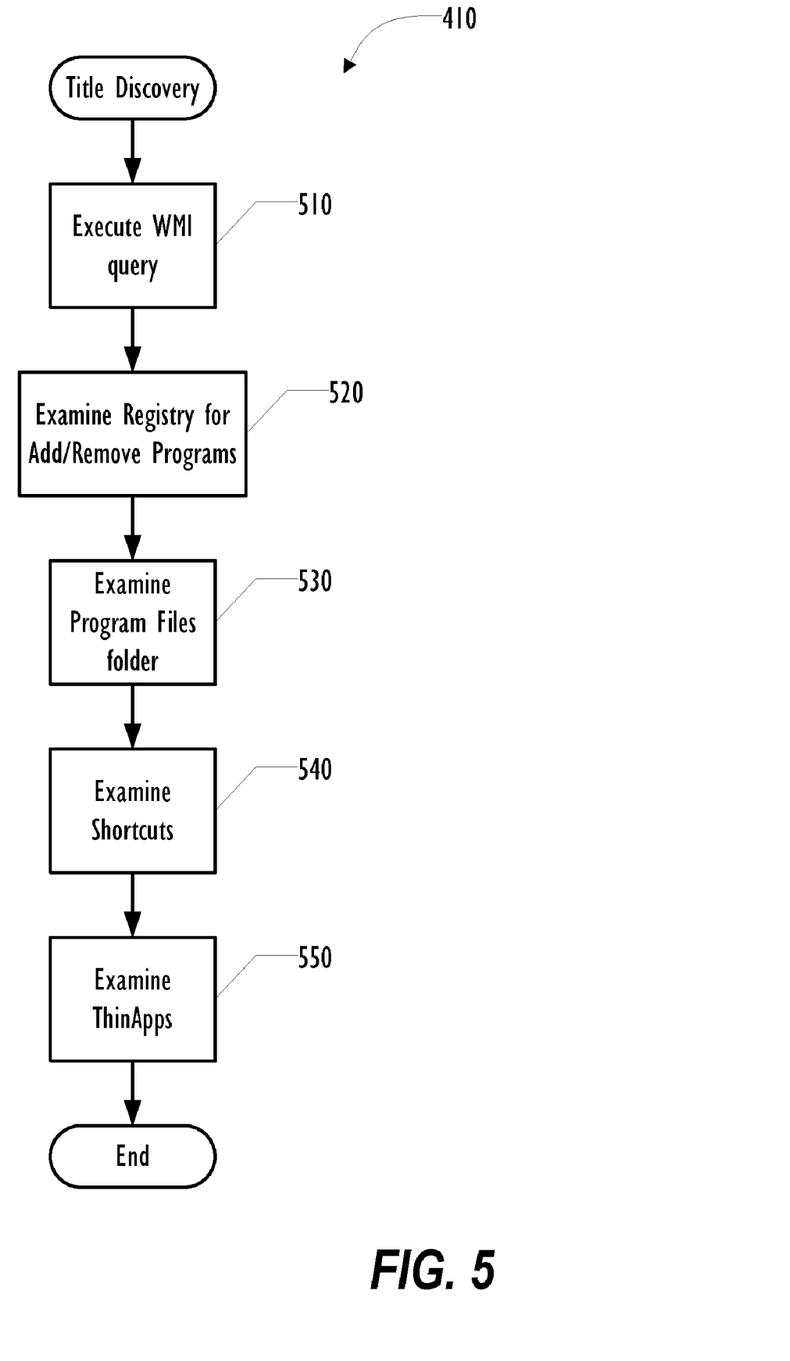
FIG. 5 shows, in flowchart form, a more detailed example of a portion of the technique of FIG. 4 according to one embodiment.

In one embodiment, five discovery attempts are performed in block 410, as illustrated in FIG. 5: WMI queries (510), Add/Remove Program examination (520); a search for executables in the Program Files folders (530); a search for executables linked by shortcuts (540), and an examination of Thinapps (550). These discovery attempts are illustrative and by way of example only, and other discovery attempts can be used. In each of the discovery attempts illustrated in FIG. 5, embodiments collect attribute information about the discovered software. In one embodiment, the collected attributes include the software's name, current version, manufacturer, globally unique identifier (GUID), install location, install date, and label, and the file name(s) of the associated executables. The list of collected information is illustrative and by way of example only, and other information may be collected as desired. Not all of the attributes may be available for every software application discovered, and not every discovery technique may result in the collection of all of the desired attributes.

Microsoft defines a standard operating system interface for software title discovery, as part of Windows Management Instrumentation (WMI). As discussed previously, Microsoft defines a process for installing applications using an MSI installer. Programs installed through an MSI installer are registered to the operating system, typically in a WMI data repository. In one embodiment, the WMI class PRODUCT is queried in block 510 to get the list of applications registered to the WMI. Applications that are installed using MSI installers are discovered from this source. WMI is not always available, however. For example, in certain older WINDOWS platforms, WMI is not enabled by default. In another example, on some computing devices 300, the WMI repository could be corrupt. If WMI is not enabled or the WMI repository is corrupt, another Microsoft standard interface, the Windows Application Programming Interface (API), often referred to as the Win32 API, may be used as an alternate approach to obtain the list of programs installed by an MSI installer.

In one embodiment, no technique specific filter is used to filter the results of the WMI query. In other embodiments, the MSI-installed program list produced by the WMI query may be filtered to eliminate operating system components or other similar software that are not considered software applications to be discovered.

In block 520, a second software discovery search is performed, using the WINDOWS registry. The registry is a hierarchical database that contains data that is critical for the operation of Windows and the applications and services that run on Windows. The data is structured in a tree format. Each node in the tree is called a key. Each key can contain both subkeys and data entries called values. Sometimes, the presence of a key is all the data that an application requires; other times, an application opens a key and uses the values associated with the key. A key can have any number of values, and the values can be in any form.

Application installers may create an uninstall command string in the WINDOWS registry to be able to uninstall the application. These applications typically store the uninstall information in the Windows registry hive identified as HKEY_LOCALMACHINE\SOFTWARE\Microsoft\Windows\CurrentVersion\Uninstall. A hive is a logical group of keys, subkeys, and values in the registry that has a set of supporting files containing backups of its data. Examination of the information contained in the Uninstall hive may identify other software applications.

On 64-bit computing devices 300, the Uninstall hive is typically found at HKEY_LOCALMACHINE\SOFTWARE\wow6432Node Microsoft\Windows\CurrentVersion\Uninstall, hence, in one embodiment, both locations are examined.

Figure 6:
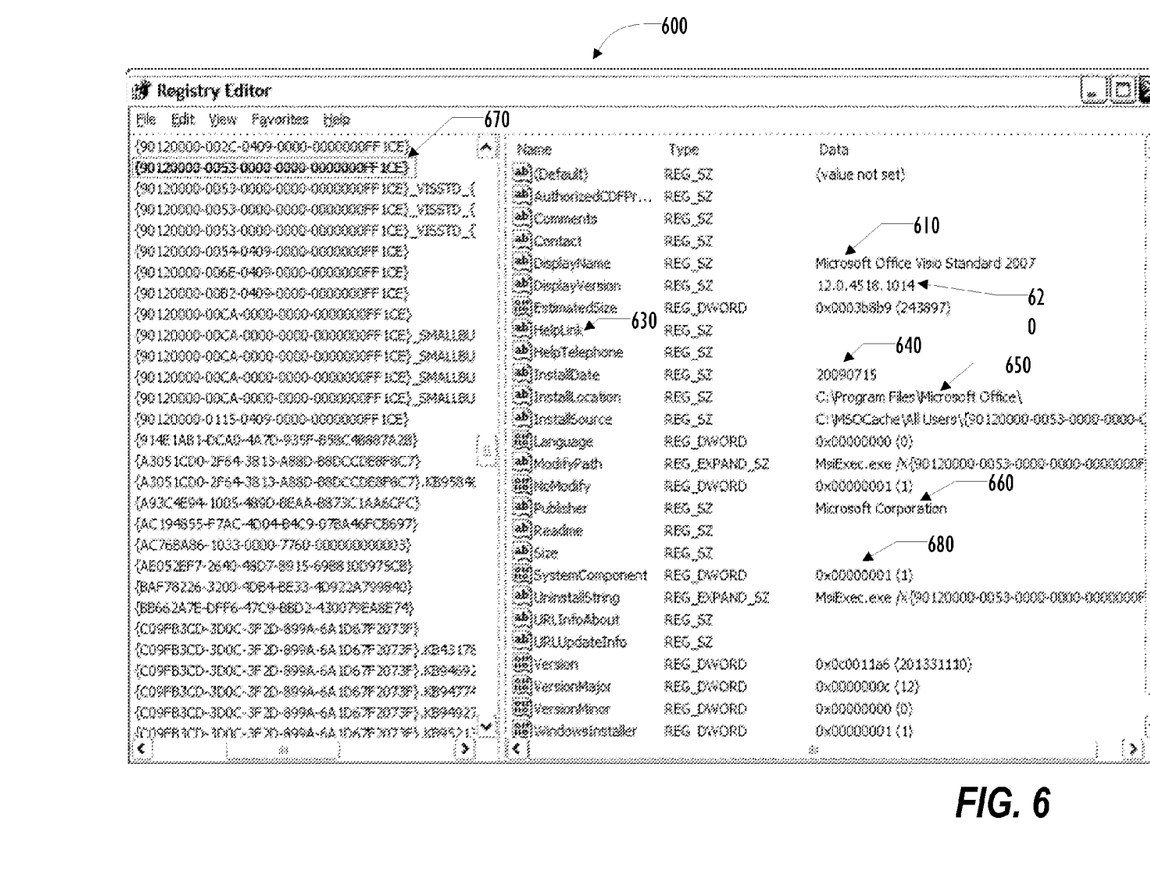
FIG. 6 shows, in screenshot form, an example collection of data in the WINDOWS registry for a software application according to the prior art.

FIG. 6 is a screen shot showing a logical group of keys and values as displayed by the regedit program, in this example illustrating the registry Uninstall data for the Microsoft Visio Standard 2007 application. As shown in the screenshot, this application has a DisplayName attribute 610 with a value of "Microsoft Office Visio Standard 2007"; a DisplayVersion attribute 620 with a value of "12.0.4518.1014"; a HelpLink attribute 630 with a null value; an InstallDate attribute 640 with a value of "20090715"; an InstallLocation attribute 650 with a value of "C:\Program Files\Microsoft Office"; a Publisher attribute 660 with a value of "Microsoft Corporation"; and a SystemComponent attribute 680 of 1. These keys and values are stored under a GUID 670 of 90120000-0053-0000-0000-0000000FF1CE.

In one embodiment, the results from the Uninstall hive search are collected and passed through a series of technique-specific filters to remove entries that are updates to the operating system or are part of the operating system. Each filter removes from the results any information that matches the filter. In one embodiment, the series of filters includes the following:

(1) Is the DisplayName property is empty?
(2) Is the SystemComponentattribute set to 1?
(3) Does the InstallLocation property start with the path to the WINDOWS operating system folder obtained using the Win32 API, typically C:\Windows?
(4) Is the Release Type attribute "update" or "hotfix"?
(5) Is the DisplayName attribute "Security Update," "Hotfix," or "Service Pack"?
(6) Is the ParentKeyName attribute empty and the Publisher attribute "Microsoft"?
(7) Is the Publisher attribute "Microsoft," does the DisplayName attribute contain "Windows," and does the HelpLinkattribute contain "kbid"?
(8) Does the registry node name start with "KB" and does a number extracted from one of the Name, DisplayName, or Helplink attributes match with the other two attributes?

If any of these filters matches a result obtained from the Uninstall hive, then that result is eliminated. The preceding list of filters is illustrative and by way of example only, and other filters and ordering of filters can be used.

Returning to FIG. 5, in block 530 the Program Files folder is examined for additional software titles. Every application folder under the Program Files folder is analyzed to collect executables. The Program Files folder is located using the Windows API, and is typically "C:\Program Files." The header properties of the collected executables are then examined to determine the name of the software title. One embodiment of this Program Files examination is illustrated in FIG. 7.

First, in block 710, the software title discovery scanner identifies the root install location of the application under the Program Files folder. If there are files found in an application folder, it is considered the root for that application. Otherwise, every folder under this folder becomes a root. For example, "C:\Program File\WinZip" is the root folder for the WINZIP® application from Winzip International LLC. In another example, applications like Microsoft Office have multiple application roots under the "C:\Program Files\Office" folder. In that example, every folder is considered as a separate application root folder.

Second, in block 720, information is collected about all of the executables under the root install location. Until a file is found, the folder tree is traversed recursively from the root folder. Once a file is found, the discovery process continues to collect executables from that folder and from up to three levels of subfolders. The traversal of the tree returns any time an executable is found. This may, and frequently does, collect a plurality of executables.

Figure 7:
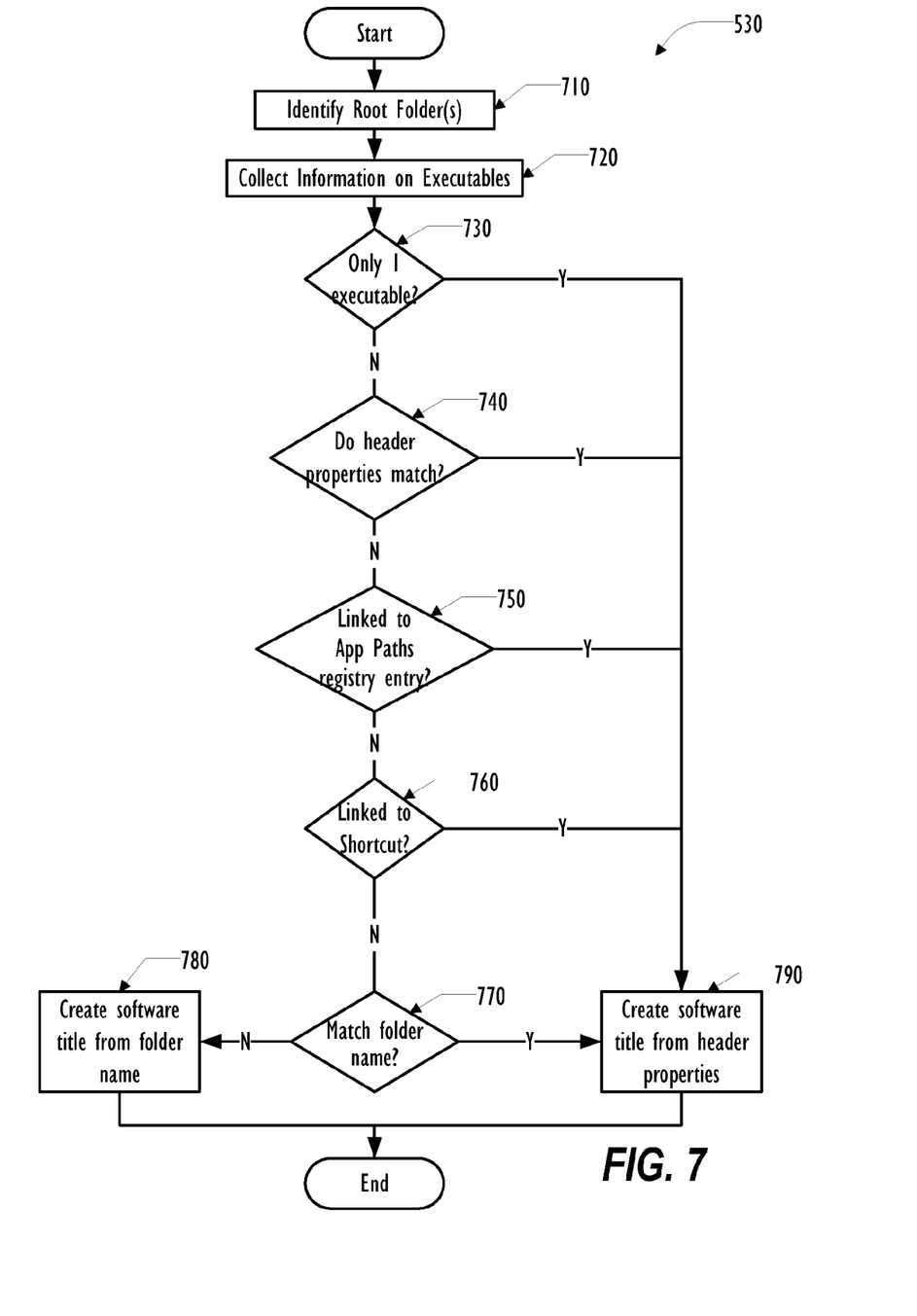
FIGS. 7-10 show, in flowchart form, more detailed examples of portions of the technique of FIG. 4 according to various embodiments.

Third, the discovery process analyzes the header properties of the collected executables to determine the attributes for creating a software title result, as illustrated in blocks 730-790 of FIG. 7. In block 730, if there is only one executable found, read the header properties to create the software title result in block 790. In block 740, compare the header properties of all of the executables to see whether they are similar; if a match is found, create a software title result from the header properties in block 790.

In block 750, if an executable is linked to a registry entry in the location "HKEY_LOCAL_MACHINE\SOFTWARE\Microsoft\Windows\CurrentVersion\App Paths" and that entry is the only executable linked to that entry, read the header properties to create a software title result in block 790. In block 760, if an executable is linked to a shortcut and this is the only executable so linked, then read the header properties to create a software title result in block 790. In block 770, match the header properties of the executables to the application folder name. If a match is found, read the header properties to create the software title result in 790. If all of the above steps fail, in block 780 create a software title result using the folder name as the software title's name.

In one embodiment, no technique-specific filters are applied to the results of the Program Files examination process of block 530.

Returning to FIG. 5, another technique for software discovery may be performed in block 540. The shortcuts (*.lnk files) found in the "Start Menu Programs," "Desktop," and "Quick Launch Toolbar" for all the users defined by the computer device 300 is parsed to determine the executable pointed to by the shortcut. The executable header properties are then fetched and Software Title entries may be created for every unique "Product Name."

The Software Title entry created from the "Start Menu Programs" shortcuts additionally contains a label attribute. The value for this label comes from the "Start Menu Programs" folder.

In one embodiment, no technique-specific filters are applied to the results of the Shortcut examination of block 540.

Another possible technique that may be used to find installed applications is to search for ThinApps in block 550. Thinapps are virtualized applications, which are packaged in such a way that the application can be installed by storing a single executable file on the computer device 300's file system, which internally contains the operating environment for the application. There are multiple vendors of ThinApps, each of which provide a vendor-specific way of virtualizing the software application into the packaging file. In block 550, the software title discovery process may interrogate the ThinApp file to determine the software application that is virtualized in the ThinApp using vendor-specific techniques. If any ThinApps are found, the collected information regarding the virtualized software application may be added to the results from the examinations of blocks 510-540 described above.

The above techniques for locating and identifying software applications are illustrative and by way of example only, and other techniques and combinations of techniques can be used as desired. While the operating system vendor predefined software title discovery technique of block 510, is always used in operating systems where such a technique is provided by the operating system vendor, the secondary techniques of blocks 520-550 may not be invoked in every situation.

After software title discovery has been performed as illustrated in FIG. 5 and discussed above, then a common filter may be applied to the results to eliminate noise.

Figure 8:
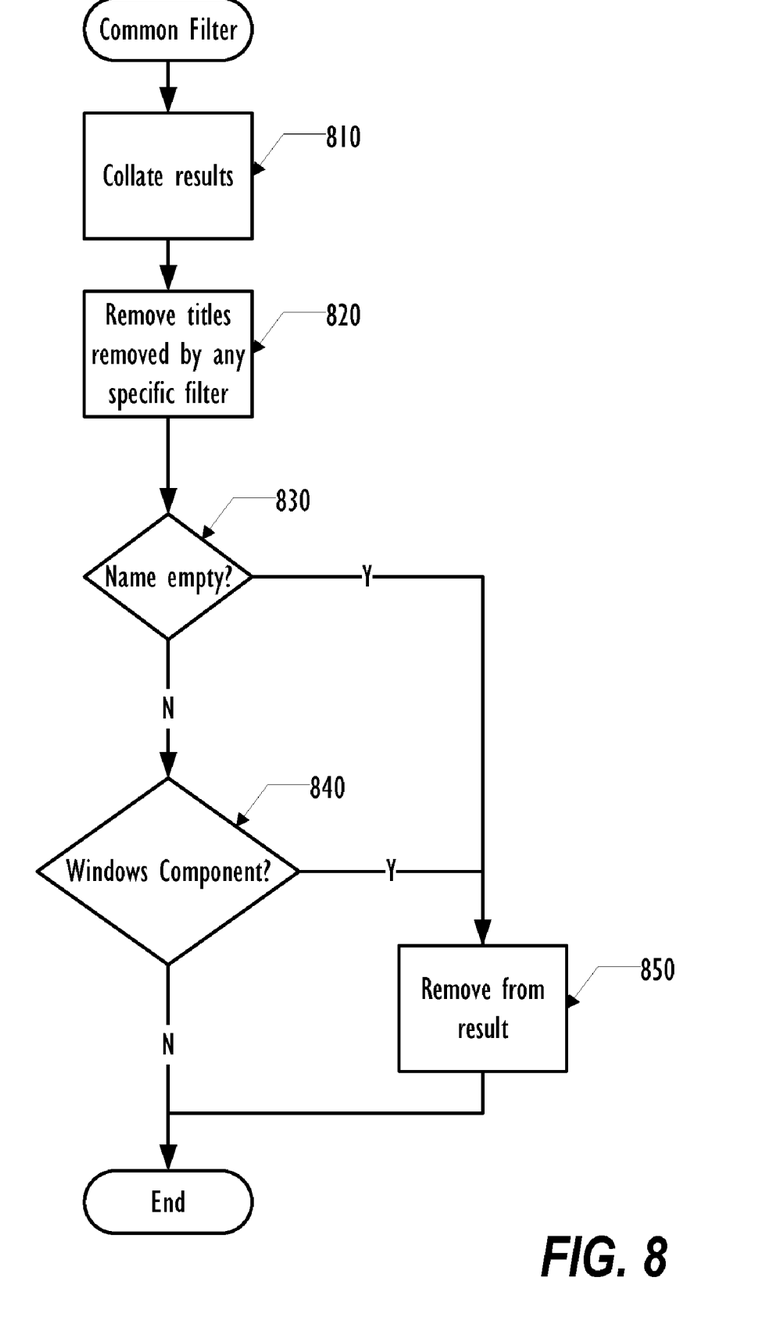

In one embodiment, illustrated in FIG. 8, the results obtained from the multiple discovery techniques are collated by the software title's name, then any software titles that were removed by any of the technique specific filters may be removed from the combined results. Otherwise, an entry marked as noise by one technique-specific filter might be captured again using a different discovery technique and not filtered by that technique.

In blocks 830-850, two filters are applied in one embodiment to the combined results of all of the software title discovery techniques. If the name of the software title is missing, as determined in block 830, the software title may be filtered out in block 850. In block 840, an effort may be made to filter out system components, by checking if the publisher of the software is Microsoft, and the name of the software is "Operating Sys," "Movie Maker," "Media Player," "Driver," or "update." If so, in block 850 the title is filtered out of the collated results.

Figure 9:
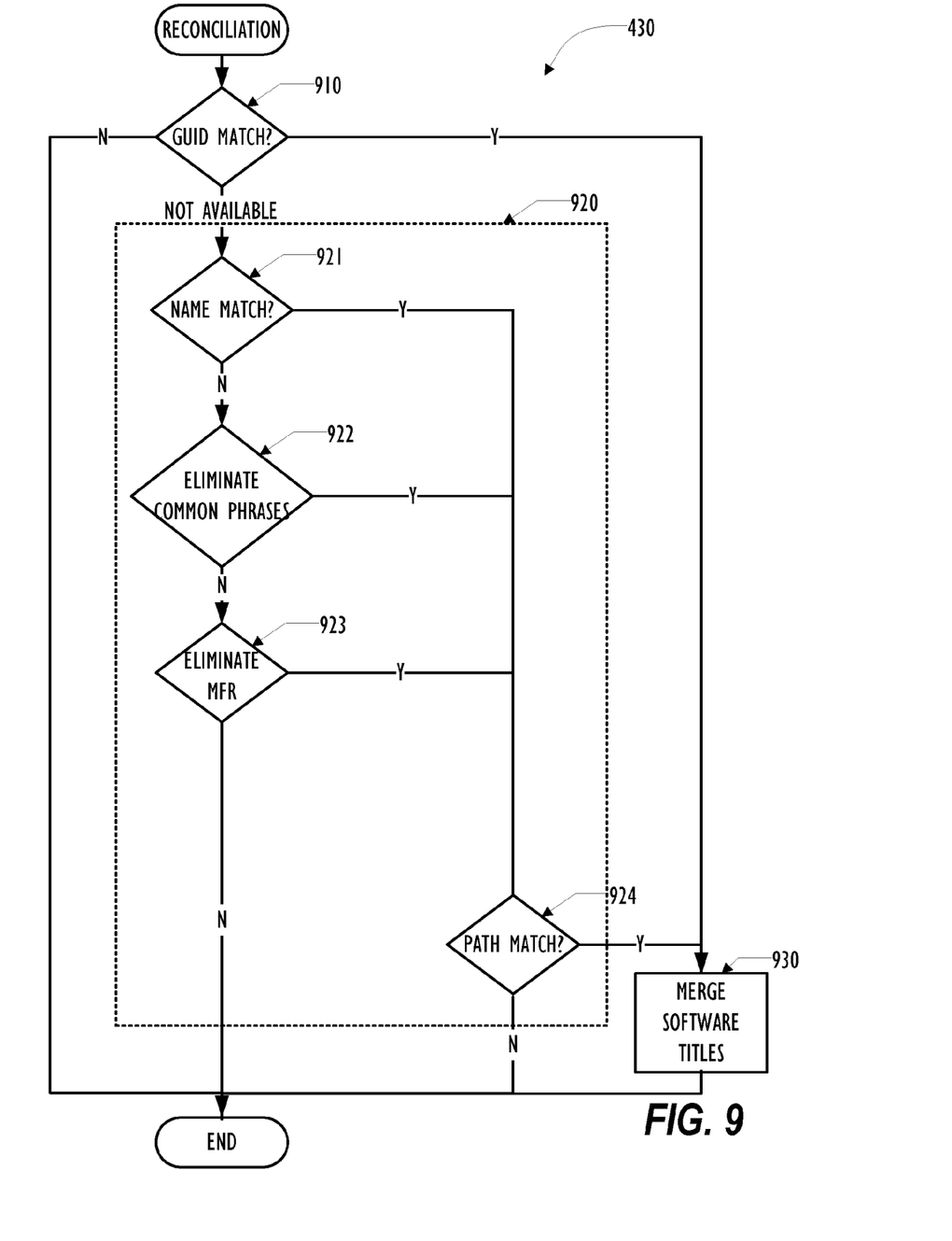

Because the software title discovery techniques described above are performed independently, using different data sources that may have overlapping contents, the collated results, even after filtering, may have duplicate entries. FIG. 9 is a flowchart illustrating one embodiment of the reconciliation technique of block 430 of FIG. 4. FIG. 9 illustrates the application of two reconciliation rules. The reconciliations rules of FIG. 9 are illustrative and by way of example only, and other reconciliation rules can be used as desired.

In block 910, the reconciliation technique 430 employs a first rule that compares the GUIDs of two candidate results for merger. If GUIDs are available for both software title results, and both GUIDs are the same, then merge the two results in block 930. If the GUIDs are different, then do not merge the two results, and bypass any other reconciliation rule processing, because the GUID difference is strong enough to show the two results are not reconcilable and should not be merged.

If the first rule does not determine whether to merge the two results, then a second rule 920 is employed. First, in block 921, the names of two candidates for merger are compared. If the names match, then in block 924, compare the installation locations. If the installation locations match, then in block 930 merge the software title entries. If the names do not match, then in block 922, the reconciliation technique eliminates elements often found in software titles, such as version numbers and words or phrases such as "alpha," "beta," etc. If the names match after eliminate those common elements, then in block 930 merge the software titles. If not, then in block 923, eliminate the manufacturer from the name if present, and redo the comparison. If the names now match, in block 924 compare the installation locations and merge the software titles in block 930 if the installation locations match. Otherwise, the two software titles are not matched with this rule.

Figure 10:
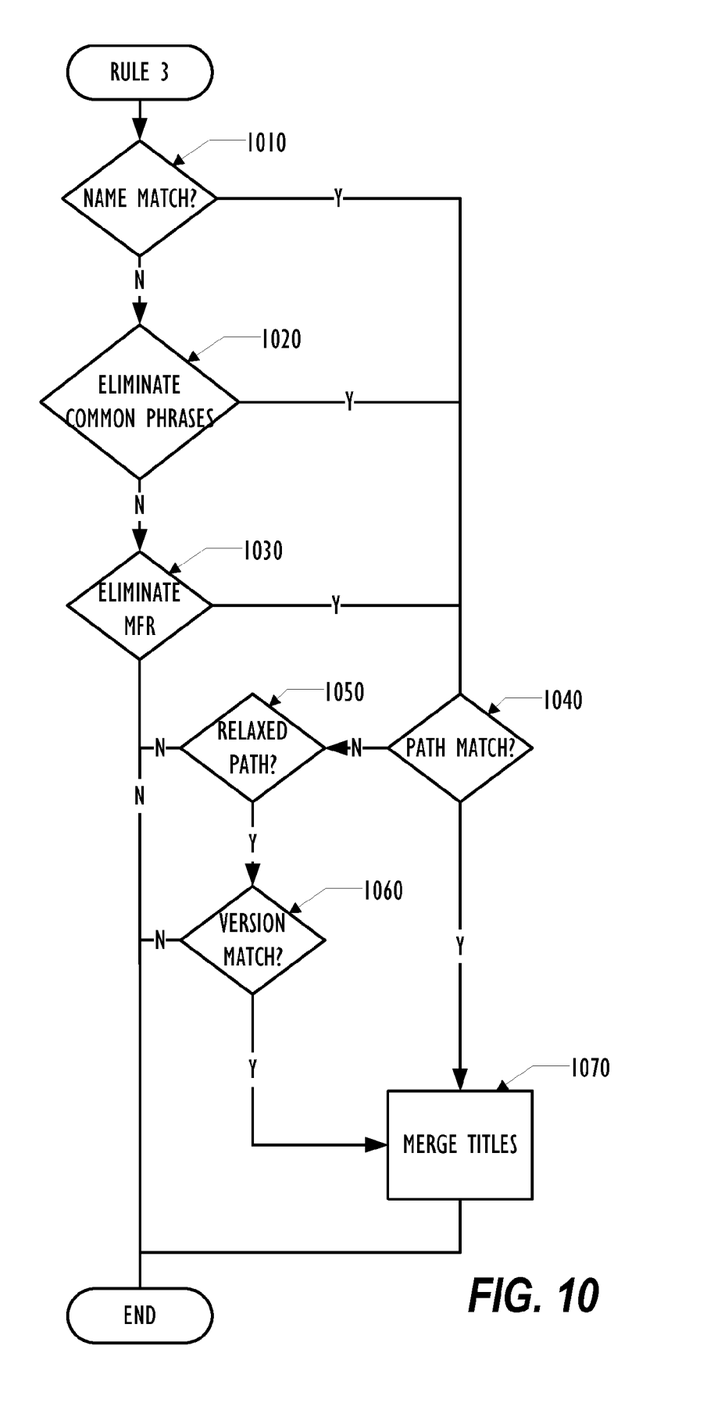

If the second rule does not result in the merger of the two software titles, a third rule may be applied in one embodiment, as illustrated in FIG. 10. Blocks 1010-1140 correspond to blocks 921-924 of FIG. 9 and are therefore not described again. In this rule, however, if the installation location does not match, the comparison is relaxed to shrink the path in block 1050 until the two installation paths match. If the paths cannot be shrunk to match, the titles cannot be merged. If the relaxed path matching of block 1050 is successful, then the version attributes of the two software titles are compared in block 1060. If the version attributes match, then the software titles may be merged in block 1070. Otherwise, the software titles are not matched with this third rule.

By filtering out noise, both in the technique-specific filters and the common filters of FIG. 8, as well as by merging software titles that can be reconciled by the rules of FIGS. 9 and 10, embodiments of the software title discovery technique may provide improved results over the prior art techniques, both including software titles that would not have otherwise been discovered, and eliminating unwanted or duplicate information.

Figure 11:
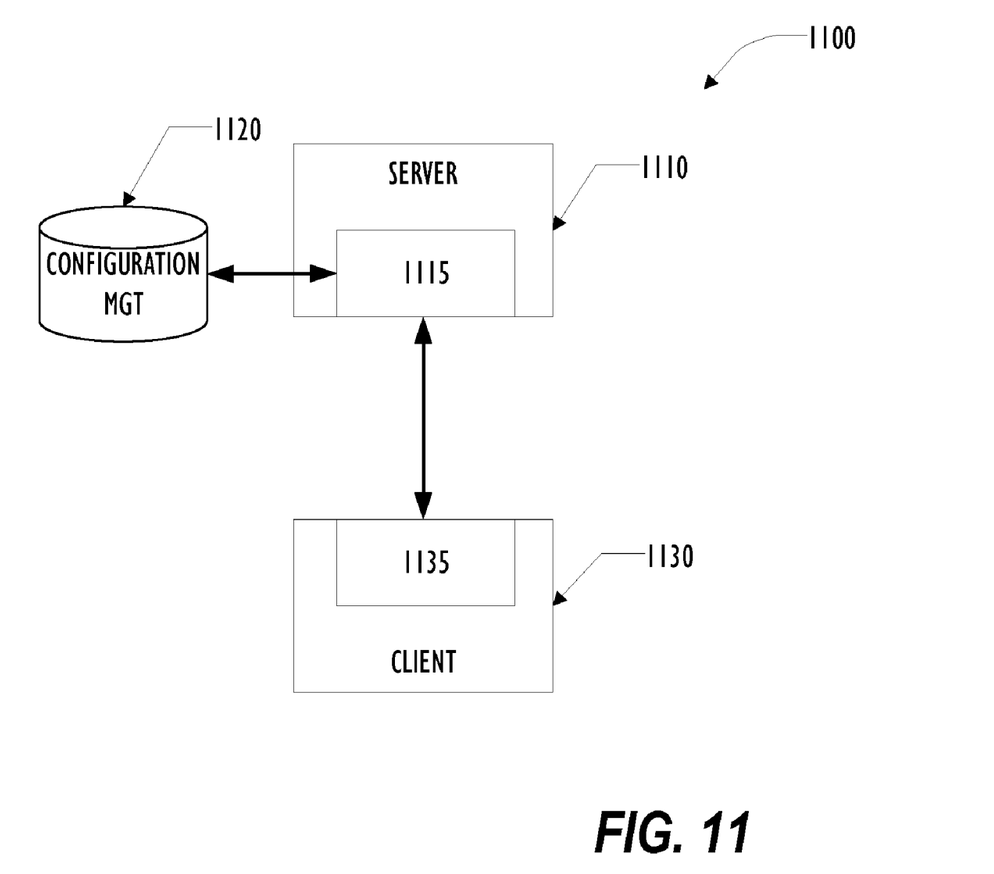
FIG. 11 shows, in block diagram form, an example system for software title discover according to one embodiment.

Software title discovery may be useful for individual computing devices 300, but may be particularly valuable to an enterprise trying to monitor usage of software across large numbers of computer devices 300. FIG. 11 is a block diagram illustrating a system 1100 for employing the software discovery techniques described above across the enterprise according to one embodiment. In a server 1110, a configuration management server software 1115 causes a configuration management client software 1135 to perform the software title discovery techniques described above in a client computing device 1130. The client software 1135 passes the results of the software title discovery to the configuration management server software 1115, which then stores the results in a configuration management database 1120 that is operatively coupled to the server 1110. A user of the configuration management server software 1115 may then prepare reports on software title installation across multiple clients 1130, allowing management of software titles across the enterprise or portions thereof. This may assist an enterprise in numerous ways, including managing its licenses for software.

In systems such as the one illustrated in FIG. 11, some of the software title discovery process illustrated in FIG. 4 may be performed on the client 1135, and some of the process may be performed on the server 1110. For example, in one embodiment, the software title discovery actions of block 410 may be performed on the client 1135, and the filtering, reconciliation, and storing of blocks 420-440 may be performed on the server 1110. In other embodiments, all of blocks 410-440 may be performed on the client 1135, and the stored results also transmitted to the server 1110 for storage in the database 1120.

Aspects of the invention are described as a method of control or manipulation of data, and may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

Various changes in the details of the illustrated operational methods are possible without departing from the scope of the following claims. For instance, illustrative flowchart steps or process steps of FIGS. 4-10 may perform the identified steps in an order different from that disclosed here. Alternatively, some embodiments may combine the activities described herein as being separate steps. Similarly, one or more of the described steps may be omitted, depending upon the specific operational environment in which the method is being implemented. In addition, acts in accordance with FIGS. 4-10 may be performed by a programmable control device executing instructions organized into one or more program modules. A programmable control device may comprise a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable media, suitable for tangibly embodying program instructions include, but are not limited to: magnetic disks (fixed, floppy, and removable) and tape; optical media such as compact disc read-only memory devices (CD-ROMs) and digital versatile discs ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of discovering installed software applications, comprising:

performing a first software application search on a computer system, creating a first set of discovered software application information;

performing a second software application search on the computer system that is different than the first software application search, creating a second set of discovered software application information;

merging the first set of discovered software application information and the second set of discovered software application information by:

collating the first set of discovered software application information and the second set of discovered software application information into a combined set of discovered software application information, employing a predefined set of rules to reconcile the first and second sets of discovered software application information that refer to similar software applications, creating a merged set of discovered software application information, and removing duplicate information from the combined set of software application information; and storing the merged set of discovered software application information, wherein the first software application search employs an operating system defined interface for obtaining software application information.

2. The method of claim 1, wherein the act of performing a second software application search comprises:

performing the second software application search;

filtering the second set of discovered software application information with a predefined filter associated with the second software application search.

3. The method of claim 1, wherein the act of merging the first set of discovered software application information and the second set of discovered software application information further comprises:

filtering the combined set of discovered software application information with a predefined filter.

4. The method of claim 1, wherein the act of performing a second software application search comprises:

searching a repository of uninstall information maintained by the operating system.

5. The method of claim 1, wherein the act of performing a second software application search comprises:

searching a predefined portion of a filesystem on the computer system for executable programs stored in the predefined portion of the filesystem.

6. The method of claim 1, wherein the act of performing a second software application search comprises:

searching files on the computer system that link to executable programs.

7. The method of claim 1, wherein the act of performing a second software application search comprises:

searching files on the computer system for packaged installation programs, which include an operating environment for installing an application.

8. The method of claim 1, wherein the combined set of software application information comprises:

a name of the software application;
a version of the software application;
a manufacturer of the software application;
a global unique identifier of the software application;
an install location of the software application;
an install date of the software application;
a label associated with the software application; and
a name of an executable program associated with the software application.

9. The method of claim 1, further comprising:

receiving an instruction from a server computer to perform software application discovery; and
reporting the combined set of software application information to the server computer.

10. A non-transitory computer readable medium with instructions for a programmable control device stored thereon wherein the instructions cause a programmable control device to perform the method of claim 1.

11. A networked computer system comprising:

a plurality of computers communicatively coupled, at least one of the plurality of computers programmed to perform at least a portion of the method of claim 1 wherein the entire method of claim 1 is performed collectively by the plurality of computers.

12. A method of discovering software applications, comprising:

requesting a client computer by a server computer to perform a software application discovery procedure based on a plurality of sources on the client computer;
receiving client software application information by the server computer that is derived from the plurality of sources on the client computer;
merging the client software application information by the server computer from the plurality of sources on the client computer by:
collating the client software application information into a combined set of discovered software application information,
employing a predefined set of rules to reconcile the client software application information that refers to similar software applications, and
removing duplicate information from the combined set of software application information;
storing the client software application information; and
generating reports based on the client software application information by the server computer,
wherein the plurality of sources on the client computer comprises:
a first source including an operating system defined interface for obtaining installed software application information, and
a second source including another source that is different than the first source for obtaining installed software application information.

13. The method of claim 12, wherein the merging of the client software application information by the server computer comprises:

filtering the combined set of discovered software application information with a predefined filter.

14. The method of claim 12, further comprising:

filtering unwanted information from the client software application information on the server computer.

15. The method of claim 12, wherein the another source for obtaining installed software application information comprises:

a repository of software application uninstall information.

16. The method of claim 12, wherein the another source for obtaining installed software application information comprises:

a portion of a filesystem of the client computer system designated for installed software applications.

17. The method of claim 12, wherein the another source for obtaining installed software application information comprises:

a plurality of files in the filesystem of the client computer that link to executable programs.

18. The method of claim 12, wherein the another source for obtaining installed software application information comprises:

a repository of software application uninstall information;
a portion of a filesystem of the client computer system designated for installed software applications; and
a plurality of files in the filesystem of the client computer that link to executable programs.

19. A non-transitory computer readable medium with instructions for a programmable control device stored thereon wherein the instructions cause a programmable control device to perform the method of claim 12.

* * * * *